(12) United States Patent
Kalau et al.

(10) Patent No.: US 7,272,469 B2
(45) Date of Patent: Sep. 18, 2007

(54) IMMOBILIZER SYSTEM FOR VEHICLES

(75) Inventors: Ed E. Kalau, Lethbridge (CA);
Herbert Peyerl, Calgary (CA)

(73) Assignee: Magtec Products Inc., Calgary, AB (CA)

( * ) Notice: Subject to any disclaimer, the term of this patent is extended or adjusted under 35 U.S.C. 154(b) by 0 days.

(21) Appl. No.: 10/791,574

(22) Filed: Mar. 3, 2004

(65) Prior Publication Data

US 2005/0197744 A1 Sep. 8, 2005

(51) Int. Cl.
*B60R 25/10* (2006.01)
(52) U.S. Cl. .............. 701/1; 340/426.1; 340/426.11; 340/438; 180/287
(58) Field of Classification Search .............. 701/1, 701/29; 340/426, 825.3, 426.1, 426.13, 426.28, 340/426.11, 438, 426.12, 426.3, 428; 180/273, 180/287; 307/10.2; 702/183; 713/323; 342/357.07
See application file for complete search history.

(56) References Cited

U.S. PATENT DOCUMENTS

| | | | |
|---|---|---|---|
| 3,718,202 A | 2/1973 | Brock | |
| 4,838,377 A | 6/1989 | Kozaki et al. | |
| 5,101,926 A | 4/1992 | Berman et al. | |
| 5,115,145 A | 5/1992 | Westberg et al. | |
| 5,287,006 A * | 2/1994 | Carlo et al. ................ | 307/10.3 |
| 5,315,286 A | 5/1994 | Nolan | |
| 5,335,748 A * | 8/1994 | Wilson ........................ | 180/270 |
| 5,370,201 A * | 12/1994 | Inubushi ..................... | 180/287 |
| 5,394,135 A | 2/1995 | Stadler | |
| 5,519,255 A | 5/1996 | Burtch et al. | |
| 5,559,491 A | 9/1996 | Stadler | |
| 5,635,901 A | 6/1997 | Weinblatt | |
| 5,745,030 A | 4/1998 | Aaron | |
| 5,828,297 A | 10/1998 | Banks et al. | |
| 6,060,981 A | 5/2000 | Landes | |
| 6,067,007 A * | 5/2000 | Gioia ..................... | 340/426.19 |
| 6,356,186 B1 | 3/2002 | Price et al. | |
| 6,452,484 B1 * | 9/2002 | Drori ..................... | 340/426.13 |
| 6,581,712 B1 * | 6/2003 | Nathans ..................... | 180/287 |
| 6,696,927 B2 * | 2/2004 | Flick ........................ | 340/426.1 |
| 6,701,231 B1 * | 3/2004 | Borugian ..................... | 701/30 |
| 6,756,886 B2 * | 6/2004 | Flick ........................ | 340/426.1 |
| 6,819,218 B2 * | 11/2004 | Mabuchi et al. ............. | 340/5.3 |
| 2004/0075541 A1 * | 4/2004 | Simoneau .............. | 340/426.11 |
| 2004/0113761 A1 * | 6/2004 | Borugian ................. | 340/426.1 |

OTHER PUBLICATIONS

International Search Report; dated Jul. 20, 2005.
Written Opinion of the International Searching Authority; Jul. 20, 2005.

* cited by examiner

*Primary Examiner*—Tuan C To
(74) *Attorney, Agent, or Firm*—Andrew R. Hicks

(57) ABSTRACT

The invention relates to an improved immobilizer system for automotive vehicles that enables a running vehicle to be effectively immobilized while an authorized driver is absent from the vehicle. The immobilizer may be operated in a number of modes that provide effective protection to a vehicle from theft in a variety of operative situations.

14 Claims, 7 Drawing Sheets

IMMOBILIZER SYSTEM FOR VEHICLES

FIELD OF THE INVENTION

The invention relates to an improved immobilizer system for automotive vehicles that enables a running vehicle to be effectively immobilized while an authorized driver is absent from the vehicle. The immobilizer may be operated in a number of modes that provide effective protection to a vehicle from theft in a variety of operative situations.

BACKGROUND OF THE INVENTION

Immobilizers for vehicles are well known. With the increasing costs associated with the theft of vehicles and their cargoes, many vehicle immobilization systems have been developed to make the theft of vehicles and cargoes more difficult. Such immobilization devices have included both mechanical and electronic means of preventing or making it more difficult to move a vehicle.

Current systems are generally designed for personal automobiles, while the subject invention is designed to meet the unique considerations associated with vehicle theft in the commercial trucking industry. Further, the trucking industry has been identified as a potential target for terrorist activities and increased security awareness is seeking higher levels of protection from unauthorized access.

Mechanical immobilization devices generally provide some form of physical impediment to the normal operation of the vehicle. For example, wheel clamps are a known form of vehicle immobilization that effectively prevents the wheels of a vehicle from being rotated. Other devices such as steering-wheel lock bars are also used by preventing the steering wheel of the vehicle from being properly operated. While such physical immobilization devices are effective in many situations, they are also disadvantaged in a number of ways. For example wheel locking clamps are cumbersome for the operator to properly install on a vehicle as they require the physical manipulation of relatively heavy components around the wheel of the vehicle. Installation of such systems is particularly disagreeable during cold or inclement weather and, as such, the design of such systems leads to their inconsistent use. Other mechanical systems such as a steering-wheel blocking devices are similarly disadvantaged by the ease with which such devices can be overcome. For example in many circumstances, the steering-wheel blocking device can be removed by inflicting relatively minor damage to the steering-wheel of the vehicle so as to enable the removable of the blocking device.

Accordingly, the use of electronic systems is preferred as such devices require relatively simply activation procedures from within the vehicle thereby promoting a more widespread use. Typically an electronic immobilization system will require a vehicle operator to insert a mechanical key, utilize a transponder device or enter a code on a key pad in order to enable a vehicle to be started by the regular ignition key of the vehicle. Other systems require a coded proximity sensor to be placed near a sensor so as to prevent deactivation of a vehicle.

While such systems are relatively effective in that they present a relatively simple procedure for use, they do not provide full protection to a vehicle in all operating conditions. For example, truck drivers will often leave their vehicle running when they stop their vehicles at road-side service centres or other unsecured locations. Vehicles may be left running to provide power to auxiliary heating or cooling systems within the vehicle that protect cargo or may be left running during periods of extreme cold weather when restarting an engine may be difficult. Basic preventative actions such as locking the vehicle doors may not be sufficient to prevent an unauthorized person from gaining access to the vehicle and thereby making off with the vehicle and its cargo.

Accordingly, there has been a need for an improved vehicle immobilization system that enables a vehicle to be effectively immobilized when it is both turned off as well as when it is running. In particular, there has been a need for a system that recognizes the departure of an authorized driver from a running vehicle and that will prevent an unauthorized driver from moving the vehicle if such a driver gains entry into the vehicle. Therefore, there is a need for a vehicle immobilization system that provides both active and passive protection to a vehicle while running.

A review of the prior art realizes that such a system has not heretobefore been proposed. Examples of such past systems are disclosed in prior art patents including U.S. Pat. No. 5,559,491, U.S. Pat. No. 5,394,135, U.S. Pat. No. 6,356,186, U.S. Pat. No. 5,828,297, U.S. Pat. No. 3,718,202, U.S. Pat. No. 5,635,901, U.S. Pat. No. 5,519,255, U.S. Pat. No. 5,315,286, U.S. Pat. No. 5,101,926, U.S. Pat. No. 4,838,377, U.S. Pat. No. 5,115,145, U.S. Pat. No. 5,745,030, U.S. Pat. No. 6,060,981 and U.S. Pat. No. 6,581,712.

SUMMARY OF THE INVENTION

In accordance with the invention, there is provided a vehicle immobilization system comprising: a microprocessor for operative connection to at least one critical run circuit of a vehicle, the microprocessor operable in a run mode and an armed mode; an input system operatively connected to the microprocessor for triggering the nicroprocessor to enter the armed mode; at least one sensor operatively connected to the microprocessor for detecting the presence of a user within the vehicle; wherein the microprocessor is responsive to a tampering event to initiate a vehicle shut-down sequence in the run and armed modes and the microprocessor is also responsive to a first activation of the at least one sensor to initiate the armed mode.

In accordance with another embodiment, the invention provides a vehicle immobilization system comprising a microprocessor for operative connection to at least one critical run circuit of a vehicle and to at least one sensor for detecting the presence of a user within the vehicle, the microprocessor operable in a run mode wherein a trigger event will initiate a shut-down sequence by opening at least one critical run circuit and an armed mode while the vehicle is running and wherein an arm signal from the at least one sensor will initiate the armed mode.

In a further embodiment, the invention provides a vehicle immobilization system comprising: a microprocessor for operative connection to at least one critical run circuit of a vehicle, the microprocessor operable in a run mode and an armed mode; a keypad input system operatively connected to the microprocessor for providing user input to the microprocessor; at least one sensor operatively connected to the microprocessor for detecting the presence of a user within the vehicle; an audio or visual alert operatively connected to the microprocessor for signalling the armed mode; a remote signal interface operatively connected to the microprocessor for receiving wireless signals from a remote source and wherein microprocessor software can be updated upon receipt of a remote signal; wherein the microprocessor is responsive to a tampering event to initiate a vehicle shut-down sequence in the run and armed modes and the microprocessor is also responsive to a first activation of the at least one sensor to initiate the armed mode and the armed mode requires user input to the input system to return the microprocessor to the run mode.

BRIEF DESCRIPTION OF THE DRAWINGS

Embodiments of the present invention will now be described with reference to the attached Figures, wherein.

DETAILED DESCRIPTION OF THE INVENTION

Figure 1:
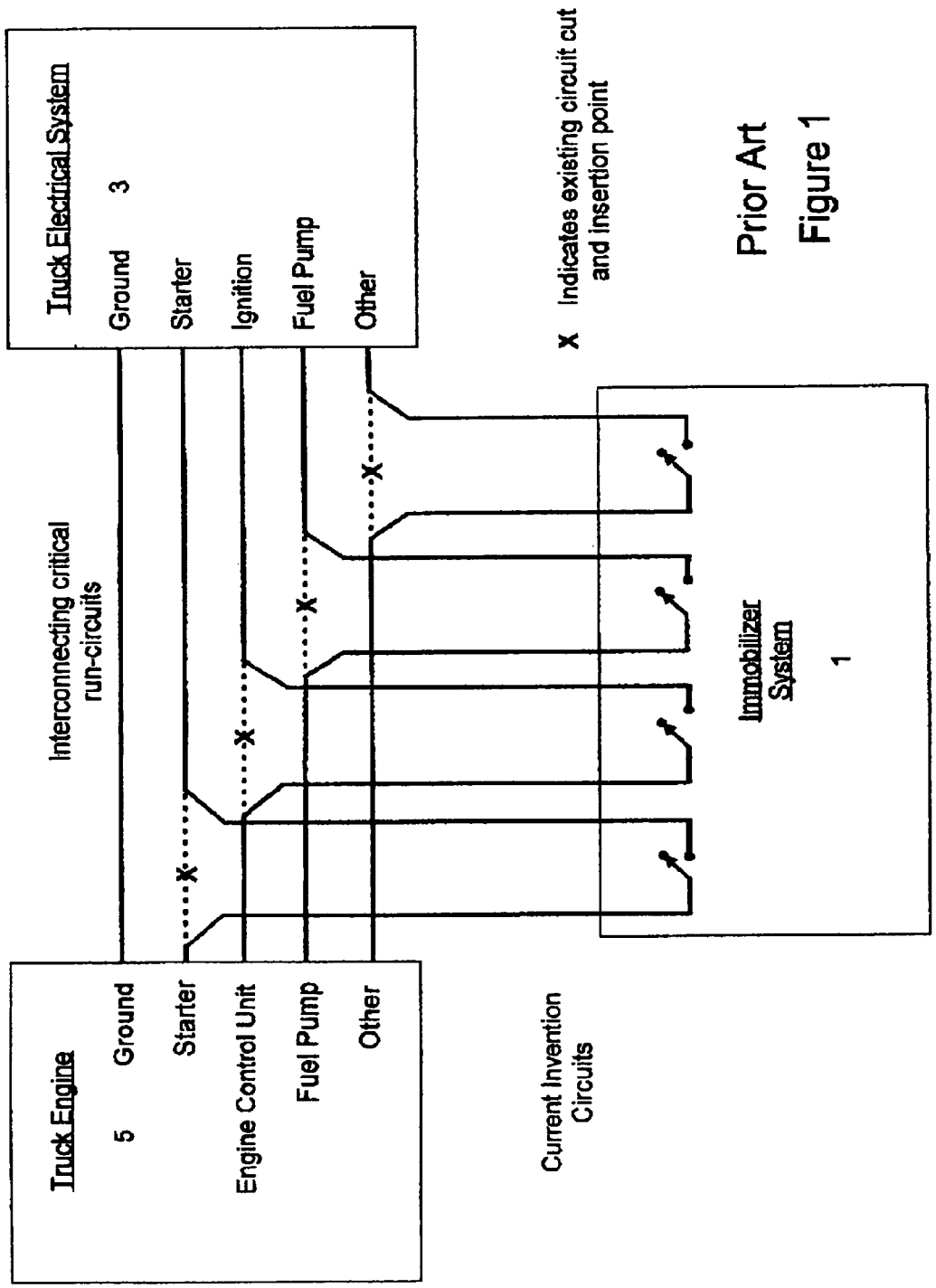
FIG. 1 is a schematic diagram of the installation of a basic immobilizer system in accordance with the prior art.

Vehicle immobilizer systems (VIS) 1 are known to be connected to critical-run circuits between a vehicle's electrical system 3 and engine 5 as shown in FIG. 1. A VIS system is installed within such critical-run circuits such as the engine starter, the engine control unit (ECU) or engine control module (ECM), fuel pump and other vehicle components that may be effective in immobilizing a vehicle. A VIS 1 generally includes relay/diode logic and a processor that can receive a variety of inputs and interpret those inputs to either allow or deny the vehicle to be started.

Figure 2:
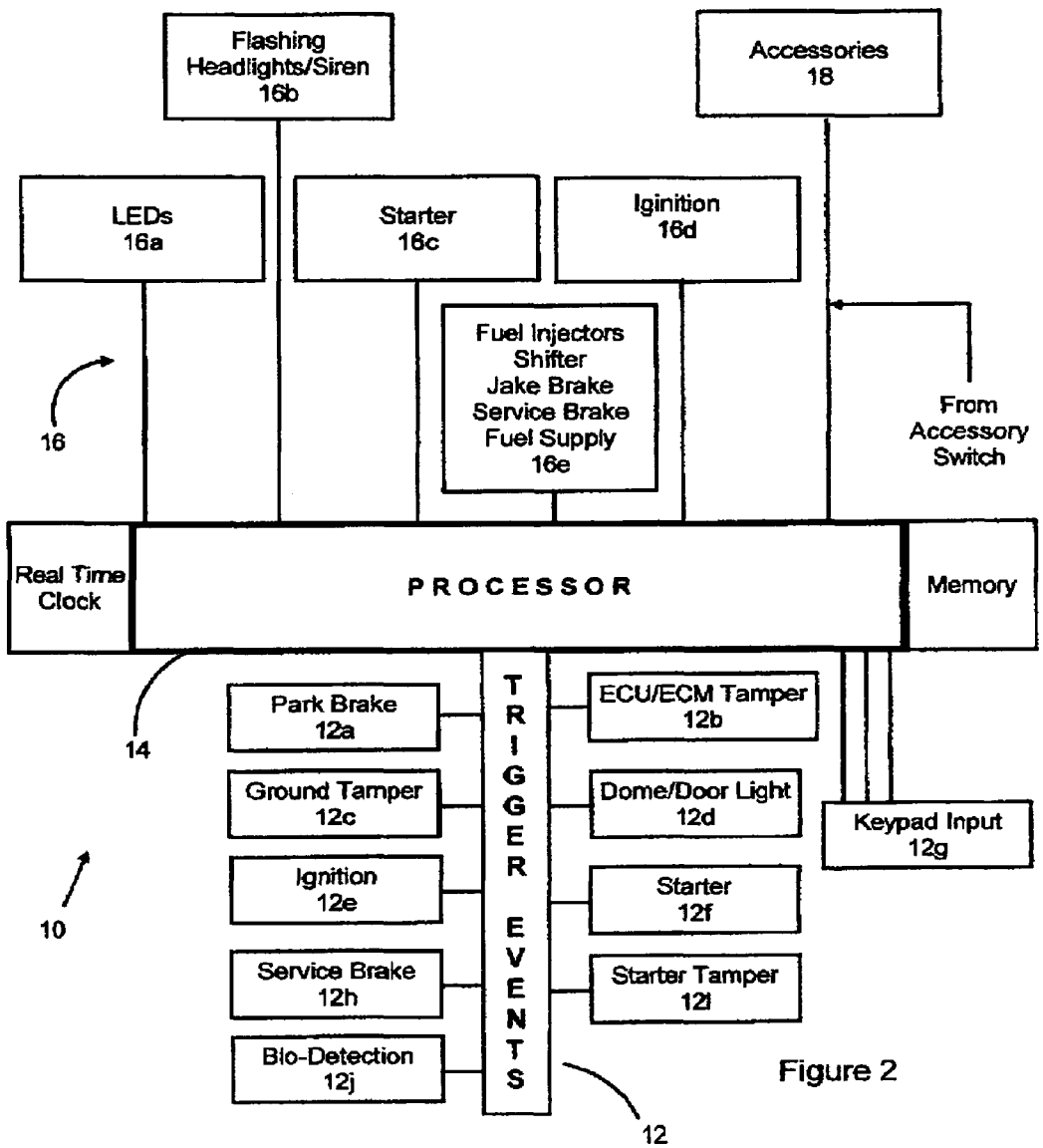
FIG. 2 is a schematic diagram of the installation of an immobilizer system in accordance with one embodiment of the invention.

FIG. 2 is representative of a typical VIS 10 in accordance with the invention wherein a plurality of inputs 12 may be provided to a processor 14 to cause one or more output events 16. For example, arm signals or trigger events (as will be explained more fully below) such as disengagement of a service brake 12h or parking brake 12a, ECU/ECM tamper 12b, ground tamper 12c or starter tamper 12i, door or dome light activation 12d, ignition 12e or starter 12f, keypad 12g tampering or biodetection 12j can be used to provide input signals to the processor 14.

Output responses may include visual output indicating system status 16a, or audio/visual such as flashing headlights or activating a siren 16b, activation or deactivation of the starter motor 16c and/or the interruption of various ignition 16d or critical run circuits 16e.

The VIS 10 also preferably ensures that, in the event that critical run circuits have been protected, that auxiliary circuits 18 within the vehicle remain active so as to prevent potential harm to critical functions such as maintaining appropriate cooling to engine components or temperature control to the vehicle interior as may be required and as is understood by those skilled in the art.

The subject invention generally provides improvements in the operation of a VIS, particularly for the heavy truck industry by specifically providing a VIS operable in different modes that enhance the performance of a VIS across a wider range of operational conditions. These modes include A) active mode, B) armed mode, C) software update mode, D) maintenance mode and E) power-failure restoration mode.

The active mode generally monitors the security of a vehicle and responds to trigger events. The armed mode generally monitors the security of the vehicle while the vehicle is running and responds to arm signals and trigger events. The software update mode generally allows VIS system software to be updated. The maintenance mode generally allows the active mode and armed mode to be overridden to allow maintenance to be performed on the vehicle and the power-failure restoration mode generally allows an operator to prevent vehicle shut-down in the event of a temporary loss of vehicle power.

A-Active Mode

As noted above, the active mode generally monitors the security of a vehicle and responds to trigger events. In a preferred embodiment, in order to access the active mode (active activation), the system requires that an authorized operator performs at least one mechanical task to enable the vehicle to be started and enter the active mode. Generally, while the vehicle is running, the system is in the active mode.

B-Armed Mode

The armed mode allows a running vehicle to be shut down if a trigger event occurs. If the vehicle is running, the system may enter the armed mode by either passive or active arming. Whilst in the armed mode, trigger events will cause the vehicle to be shut-down unless the system is de-armed within a specified time. De-arming the system will return the system to the run mode. De-arming the system may be passive or active.

Generally, passive arming or passive de-arming of the system (unlike active activation) does not require that an authorized operator perform a mechanical task to arm or de-arm the system whereas active arming or active de-arming of the system requires that the authorized operator specifically performs at least one mechanical task to arm or de-arm the system usually upon exit from or entry to the vehicle. Such mechanical tasks may require the user to manually enter a security code to a keypad input, utilize a mechanical or electromagnetic key, and/or provide biometric information to a biometric sensor within the vehicle.

For passive arming, the system responds to one or more arming signals received from various vehicle sensors whilst the system is in the run mode. The sensors may be configured to various vehicle systems and are intended to signal the arrival or departure of a person to or from the vehicle. For example, by monitoring various events such as the engagement of a parking brake, the activation of a dome light in response to the opening of a vehicle door, activation of a motion detector, unfastening a seat belt, or unweighting the driver seat can be used to provide passive arming functionality.

Passive de-arming and passive activation are also contemplated within the context of the invention wherein the system does not require that a mechanical task be performed to either de-arm the system (whilst in armed mode) or to start the vehicle (to enter the run mode). Embodiments of the invention where passive de-arming and passive activation are enabled require that the system have sensors to detect the presence of an authorized user. Such sensors may be proximity sensors (as noted above) having a greater range of sensitivity that do not require an authorized user to mechanically place a card or device in physical proximity to a receiver sensor. Other embodiments of such passive sensing systems may include radio frequency short range emitter systems that would be carried by authorized users.

Figure 3:
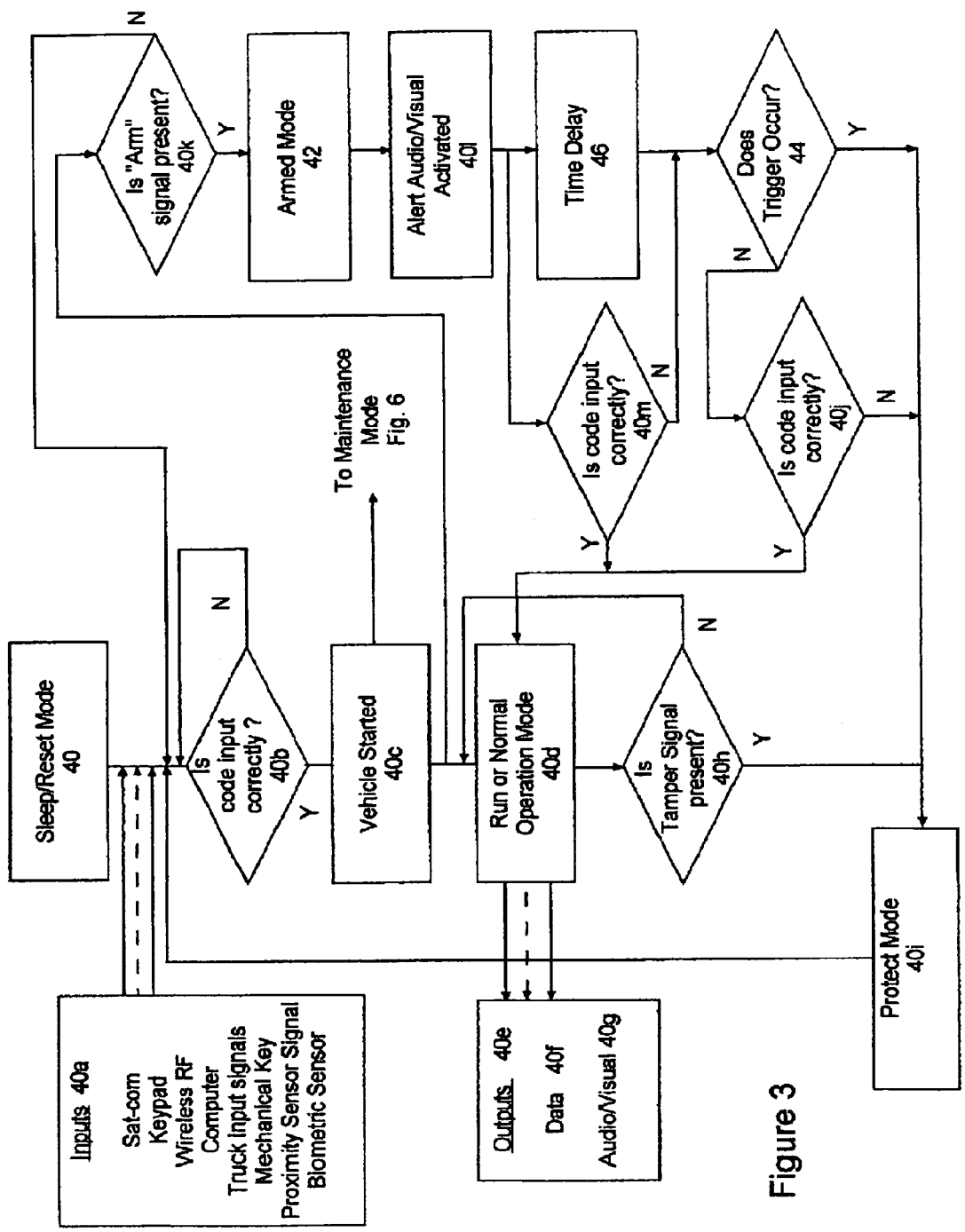
FIG. 3 is a flow diagram of the operation of an immobilizer system in accordance with one embodiment of the invention in a run mode.

FIG. 3 is representative of the normal operation of a VIS 10 in accordance with the invention. Prior to vehicle start-up, the VIS is in a sleep/reset mode 40. Whilst in the sleep/reset mode, the VIS is awaiting a variety of inputs 40a from either a user to start the vehicle or is otherwise awaiting other inputs from a central agency to update microprocessor information or programming. Furthermore, whilst in the sleep mode, the VIS monitors critical run circuits that will prevent the vehicle from being started in the event of tampering as is known in the art.

Within the context of the following description arm signals, trigger events, tamper signals and trip signals are defined.

Arm signals are defined as those signals that cause the system to enter the armed mode. Arm signals are generally more benign than other events and are not necessarily associated with critical run circuits. Arm signals may be provided by arm signal sensors including sensors associated with a door opening (dome or door light), parking brake activation, seat belts, and/or seat weight sensors.

Trigger events are those events associated with attempts to move a vehicle or interfere with critical run circuits. Trigger events may be caused by tamper signals that indicate that a critical run circuit is being interfered with or by trip signals that indicate that an attempt is being made to move a vehicle that is in the armed mode. Thus, trip signals may include signals from the engagement of vehicle gears or parking brake deactivation that would indicate that the vehicle is about to be moved.

In each case, the precise number of events (or sequence of events) that may constitute any one of an arm signal, trigger event, tamper signal or trip signal may be determined by microprocessor programming.

If a user wishes to start the vehicle, a correct input or activation code must be provided to the system. As noted above, correct input codes may be provided by such means, for example, as manual keypads, proximity sensors, mechanical keys or biometric sensors but may also include passive activation means.

If the code is entered correctly 40b, the vehicle may be started with the ignition key at which point the system is in a run mode 40d. If all progresses normally (that is, the vehicle is operated without a tamper event or arm signal occurring), the system will provide various outputs 40e including data logging of running events 40f as well as audio and visual status outputs 40g to the user. If a tamper signal is received 40h due to physical tampering with critical run circuits within the vehicle, the system enters a protect mode 40i which will commence engine shut-down.

During run mode 40d, the system also checks for an arm signal 40k from an arm signal sensor. When an arm signal is received, the system enters the armed mode 42 and the system will preferably provide visual/audio output 40l to indicate that the vehicle is in the armed mode 42. A time delay 46 is then initiated. In the event that a de-arming code 40m is entered prior to the expiry of the time delay 46, the system returns to the run mode 40d. In the event that a de-arming code 40m is not entered upon expiry of the time delay 46, the system awaits a trigger event 44 to occur. If a trigger event occurs, the vehicle will enter protect mode 40i and vehicle shutdown will commence. If a trigger event does not occur, the system will await entry of the correct de-arming code 40j and the system will return to run mode 40d. Otherwise, if the correct de-arming code 40j is not entered, the system will enter protect mode 40i.

C-Software Update Mode

Figure 4:
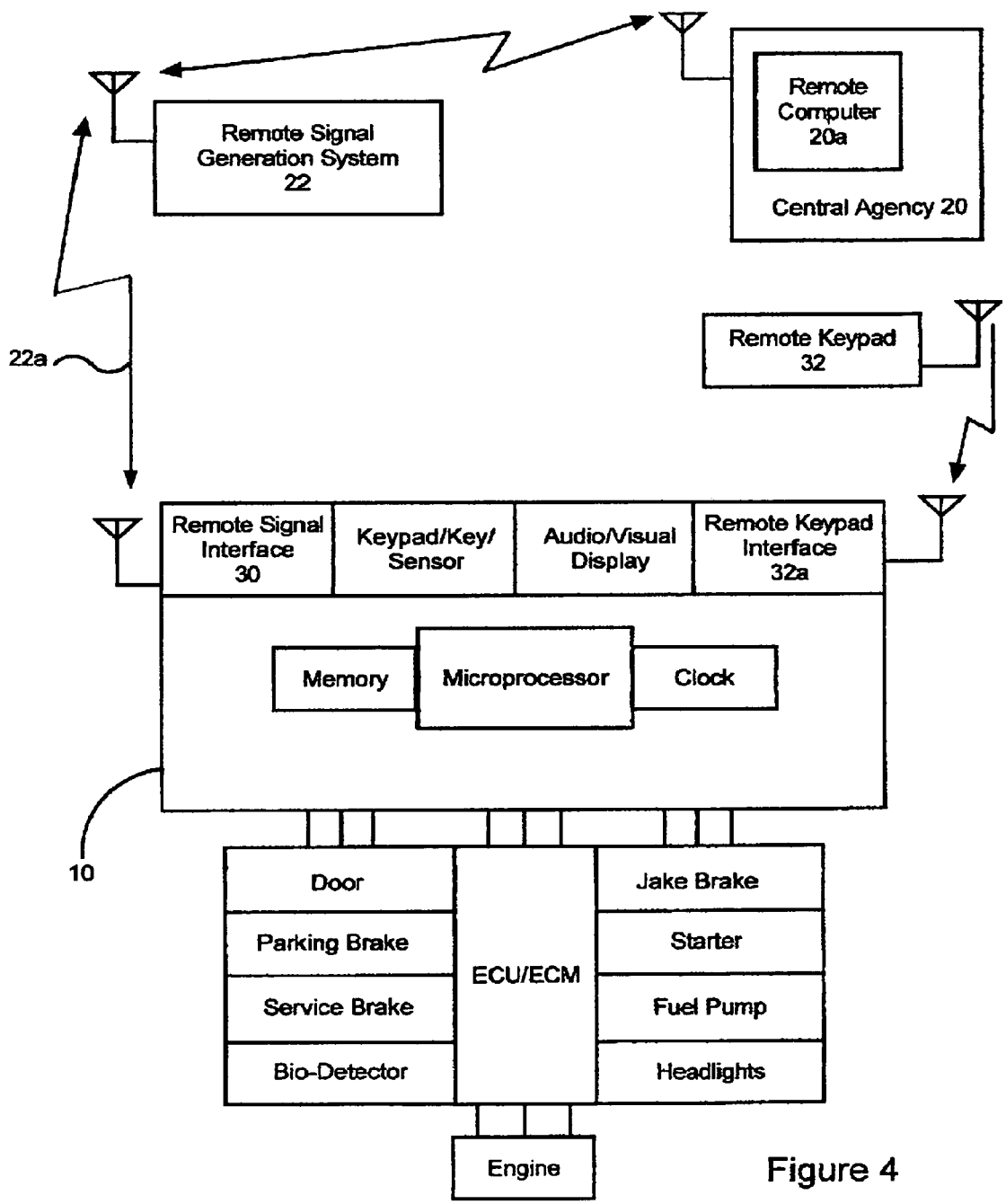
FIG. 4 is a schematic diagram of an immobilizer system in accordance with one embodiment of the invention having a wireless interface.

The system also provides remote operation capabilities that enables control of the system from a central location via wireless networks in a software update mode. Wireless control of the system can be implemented to override the actions of an authorized or unauthorized user and to provide updates to system software. FIG. 4 is representative of a VIS in which an authorized central agency 20 can wirelessly access the VIS 10 to change activation, arming or de-arming codes or otherwise update system software, preferably using a satellite or cellular phone network. As shown, the central agency 20 may have an appropriate computer 20a, that can access a remote signal generation system 22 that generates a signal 22a that can be received by a VIS 10. The computer 20a may access the remote signal generation system 22 by the internet or other network connection such as the phone or cellular phone networks. The remote signal generation system 22 may be a cellular telephone or satellite communication system. In this embodiment, the VIS includes a remote signal interface 30 for receiving the remote signal.

Also shown in FIG. 4 is an embodiment wherein the VIS includes a remote keypad 32 and remote keypad interface 32a that provides a wireless communication link between a keypad and the VIS.

Figure 5:
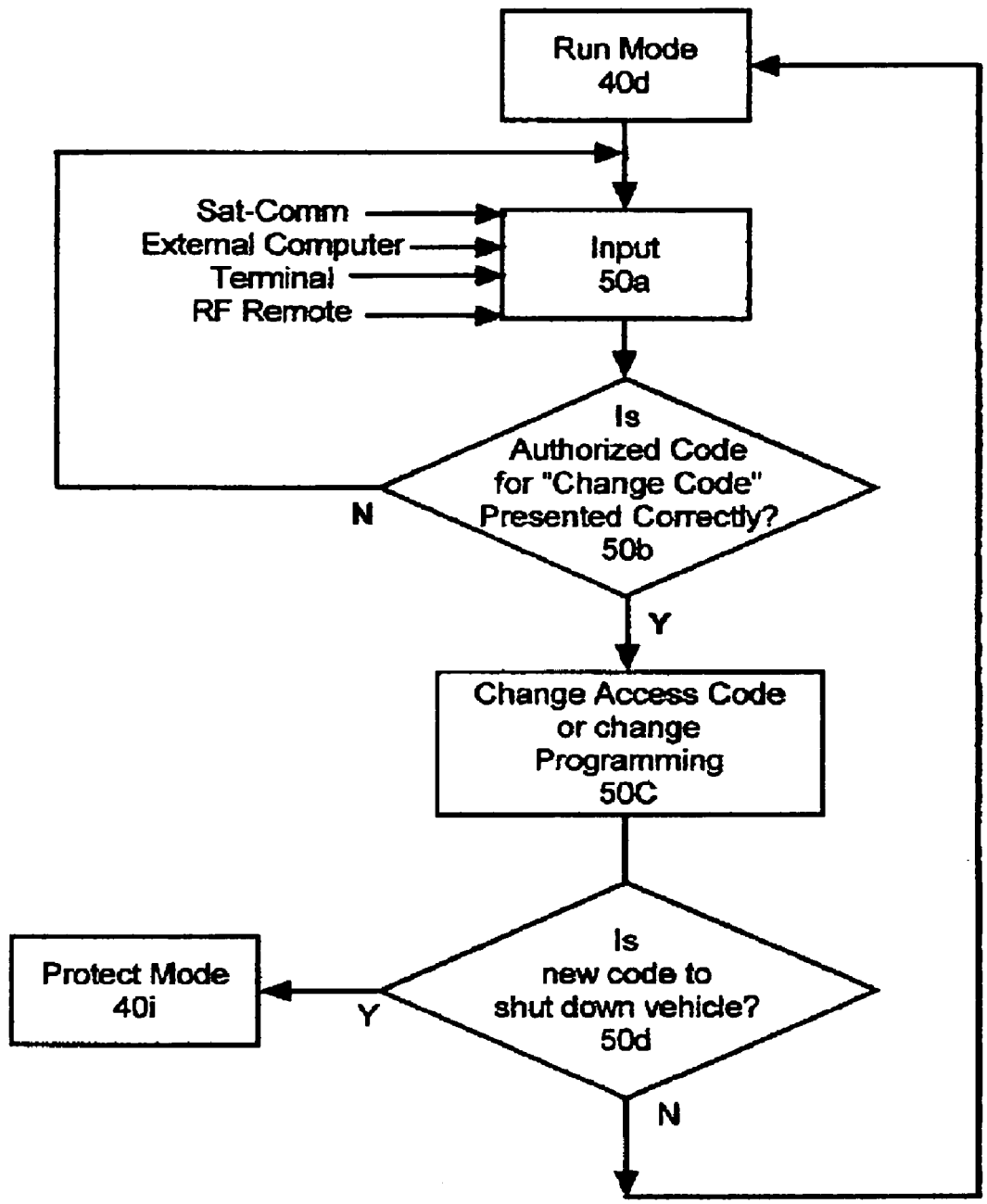
FIG. 5 is a flow diagram of the operation of an immobilizer system in accordance with one embodiment of the invention in a software update mode.

With reference to FIG. 5, during run mode 40d, the system may receive input signals 50a from external sources to change system access codes (activation, arming and de-arming codes) or system software. The system will first determine if the change input is being sent by an authorized source 50b. Following acceptance of the. authorized source, the system will accept the change 50c.

In one embodiment, the system may also receive a command to shut down the vehicle. In the event that a shut down command is received, the processor will preferably include programmed logic that determines if it is safe to shut down at this time. For example, it is preferable that the vehicle would not be shut down if the system is in maintenance mode (as described below) or it is determined that the vehicle is moving, unless there is a strong likelihood that a terrorist or high-jacking activity suspected. If it is determined that it is safe to shut down the vehicle, the system will commence shut down 40i. Otherwise, the system will return to the run mode 40d.

D-Maintenance Mode

Figure 6:
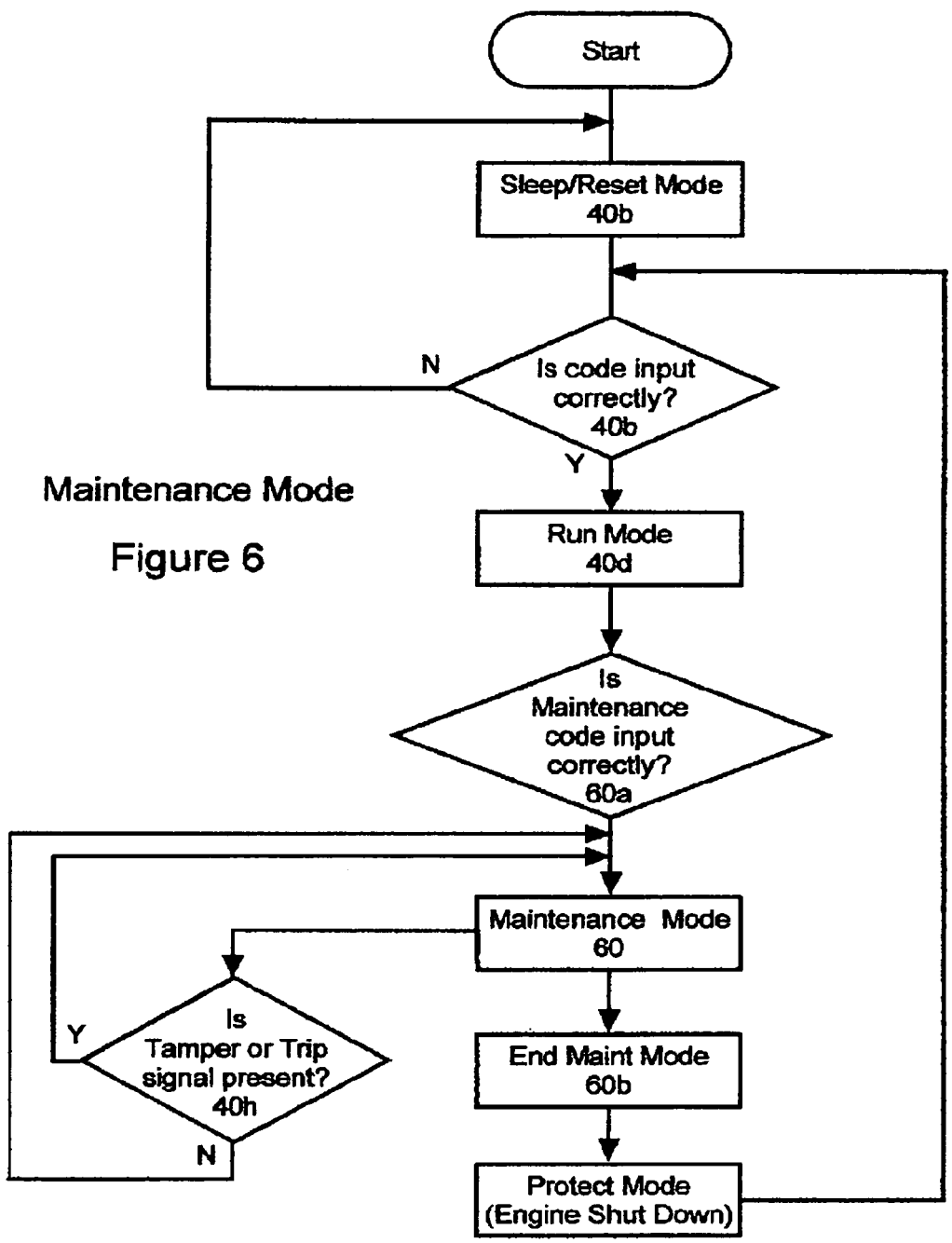
FIG. 6 is a flow diagram of the operation of an immobilizer system in accordance with one embodiment of the invention in a maintenance mode; and, FIG. 7 is a flow diagram of an immobilizer system in accordance with one embodiment of the invention in a power-failure restoration mode.

With reference to FIG. 6, a maintenance mode 60 is described that enables maintenance personnel to perform maintenance on the vehicle without triggering shut down 40i that would otherwise occur if the vehicle was in run mode 40d.

The system 10 may be put into maintenance mode 60 from the run mode 40d while the vehicle is running by inputting a proper maintenance code that the processor is programmed to accept. If the maintenance code 60a has been correctly entered, the vehicle will enter the maintenance mode 60. If the maintenance code 60a has not been entered correctly, the system remains in the run mode 40d. If a tamper signal occurs 40h whilst in the maintenance mode, the system will remain in the maintenance mode. The maintenance mode can be terminated 60b upon either or both of the expiry of a pre-determined time limit or by entering a maintenance deactivation code.

E-Power-Failure Restoration Mode

Figure 7:
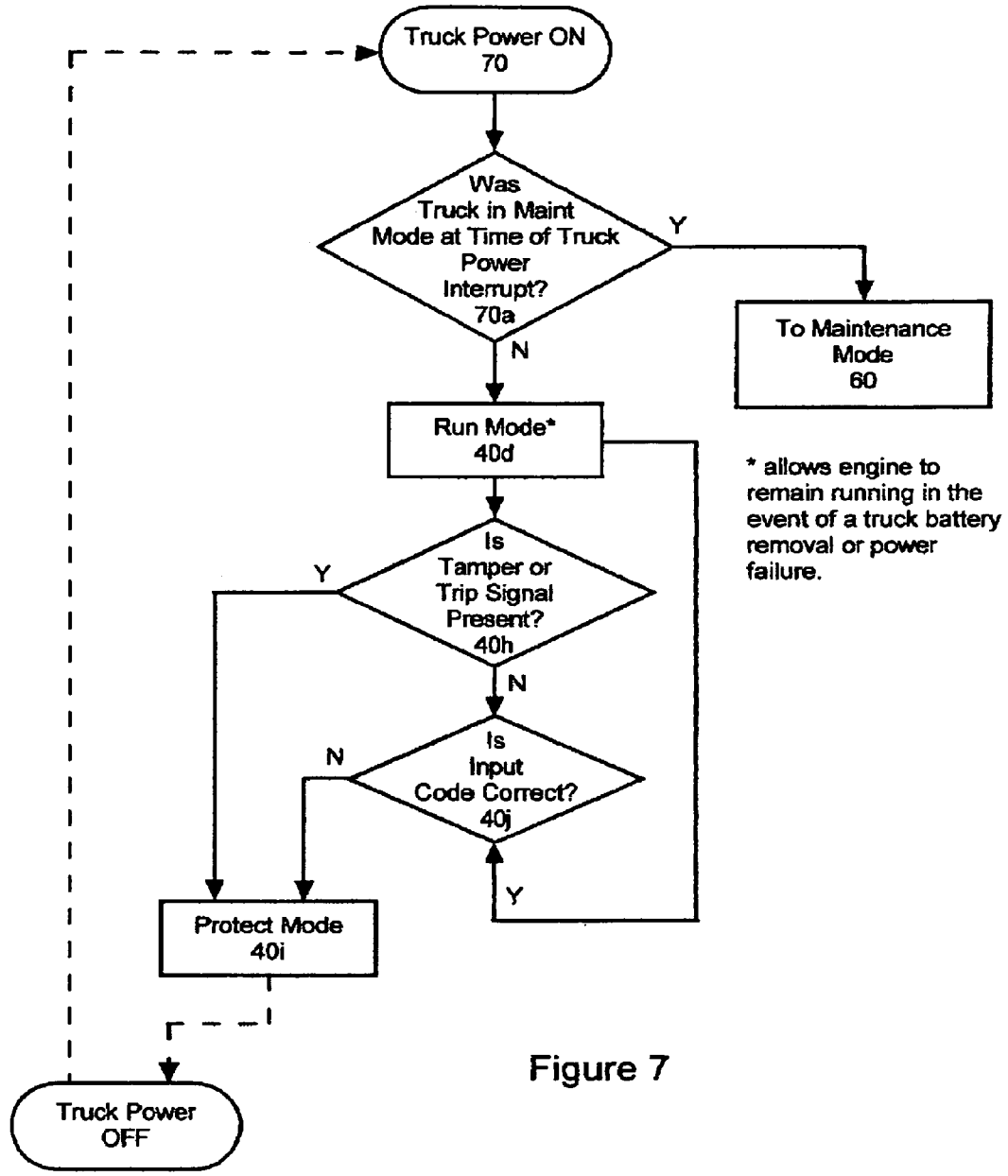

With reference to FIG. 7, the system also includes a power-failure restoration mode that enables continued operation of the vehicle in the event of an unintentional interruption in the vehicle power supply. In the event of an interruption in the vehicle's power supply while the vehicle is running, the system will first determine if the vehicle is in maintenance mode 60 at the time of the power interruption 70*a*. If the system determines that the vehicle was in maintenance mode 60 at the time of the power interruption, the system remains in maintenance mode 60.

If at 70*a* the system determines that the vehicle was not in maintenance mode 60, the system will remain in run mode 40*d* whereupon the system will check for a tamper or trip signal 40*h*. If a tamper or trip signal is received, the system will enter protect mode 40*i*. If a tamper or trip signal has not been received, the user is prompted to enter a resume code 40*j*. If the correct resume code is entered the system returns to run mode 40*d*, otherwise the system enters protect mode 40*i*.

What is claimed is:

1. A vehicle immobilization system comprising:
    a microprocessor connected to at least one critical run circuit of a vehicle, the microprocessor operable in a run mode and an armed mode;
    an input system, operatively connected to the microprocessor, configured to provide user input to the microprocessor;
    at least one sensor, operatively connected to the microprocessor, for configured to trigger the microprocessor to enter the armed mode;
    wherein the microprocessor is responsive to a tampering event to initiate a vehicle shut-down sequence in the run and armed modes and the microprocessor is also responsive to a first activation of the at least one sensor to initiate the armed mode, and wherein the microprocessor is also operable in a maintenance mode and requires entry of a maintenance code to enter the maintenance mode the maintenance mode being defined as a mode during which a tampering event will not initiate the vehicle shut-down sequence and wherein the armed mode requires user input to the input system to return the microprocessor to the run mode.

2. A vehicle immobilization system as in claim 1 wherein the armed mode is operable when the vehicle is running.

3. A vehicle immobilization system as in claim 1 wherein the at least one sensor detects the presence of a user within the vehicle.

4. A vehicle immobilization system as in claim 1 further comprising an audio or visual alert operatively connected to the microprocessor for signalling the armed mode.

5. A vehicle immobilization system as in claim 1 wherein the input system includes a keypad.

6. A vehicle immobilization system as in claim 5 wherein the keypad is wirelessly connected to the microprocessor.

7. A vehicle immobilization system as in claim 1 wherein the input system is any one of or a combination of keypad, a wireless keypad, a mechanical key, an electromagnetic key, or a biometric sensor.

8. A vehicle immobilization system as in claim 1 wherein the microprocessor is responsive to an input signal from any one of or a combination of a vehicle parking brake sensor, a dome light sensor, a motion detector, or seat weight sensor to enter the armed mode.

9. A vehicle immobilization system as in claim 1 further comprising a remote signal interface operatively connected to the microprocessor for receiving wireless signals from a remote source and wherein microprocessor software can be updated upon receipt of the remote signal.

10. A vehicle immobilization system as in claim 1 further comprising a remote signal interface operatively connected to the microprocessor for receiving a wireless shutdown signal from a remote source to initiate the vehicle shut-down sequence.

11. A vehicle immobilization system as in claim 1 further comprising a remote signal interface operatively connected to the microprocessor for receiving wireless signals from a remote source and wherein microprocessor codes can be updated upon receipt of the remote signal.

12. A vehicle immobilization system as in claim 1 wherein the microprocessor requires entry of a maintenance code to exit the maintenance mode.

13. A vehicle immobilization system comprising:
    a microprocessor connected to at least one critical run circuit of a vehicle, the microprocessor operable in a run mode and an armed mode;
    a keypad input system, operatively connected to the microprocessor, configured to provide user input to the microprocessor;
    at least one sensor, operatively connected to the microprocessor, configured to detect the presence of a user within the vehicle;
    an audio or visual alert, operatively connected to the microprocessor, configured to signal the armed mode;
    a remote signal interface, operatively connected to the microprocessor, configured to receive wireless signals from a remote source and wherein microprocessor software can be updated upon receipt of a remote signal;
    wherein the microprocessor is responsive to a tampering event to initiate a vehicle shut-down sequence in the run and armed modes and the microprocessor is also responsive to a first activation of the at least one sensor to initiate the armed mode and the armed mode requires user input to the input system to return the microprocessor to the run mode and wherein the microprocessor is also operable in a maintenance mode the maintenance mode being defined as a mode during which a tampering event will not initiate the vehicle shut-down sequence, the maintenance mode requiring entry of a maintenance code to enter the maintenance mode.

14. A vehicle immobilization system as in claim 13 wherein the microprocessor requires entry of a maintenance code to exit the maintenance mode.

* * * * *